United States Patent Office 3,303,017
Patented Feb. 7, 1967

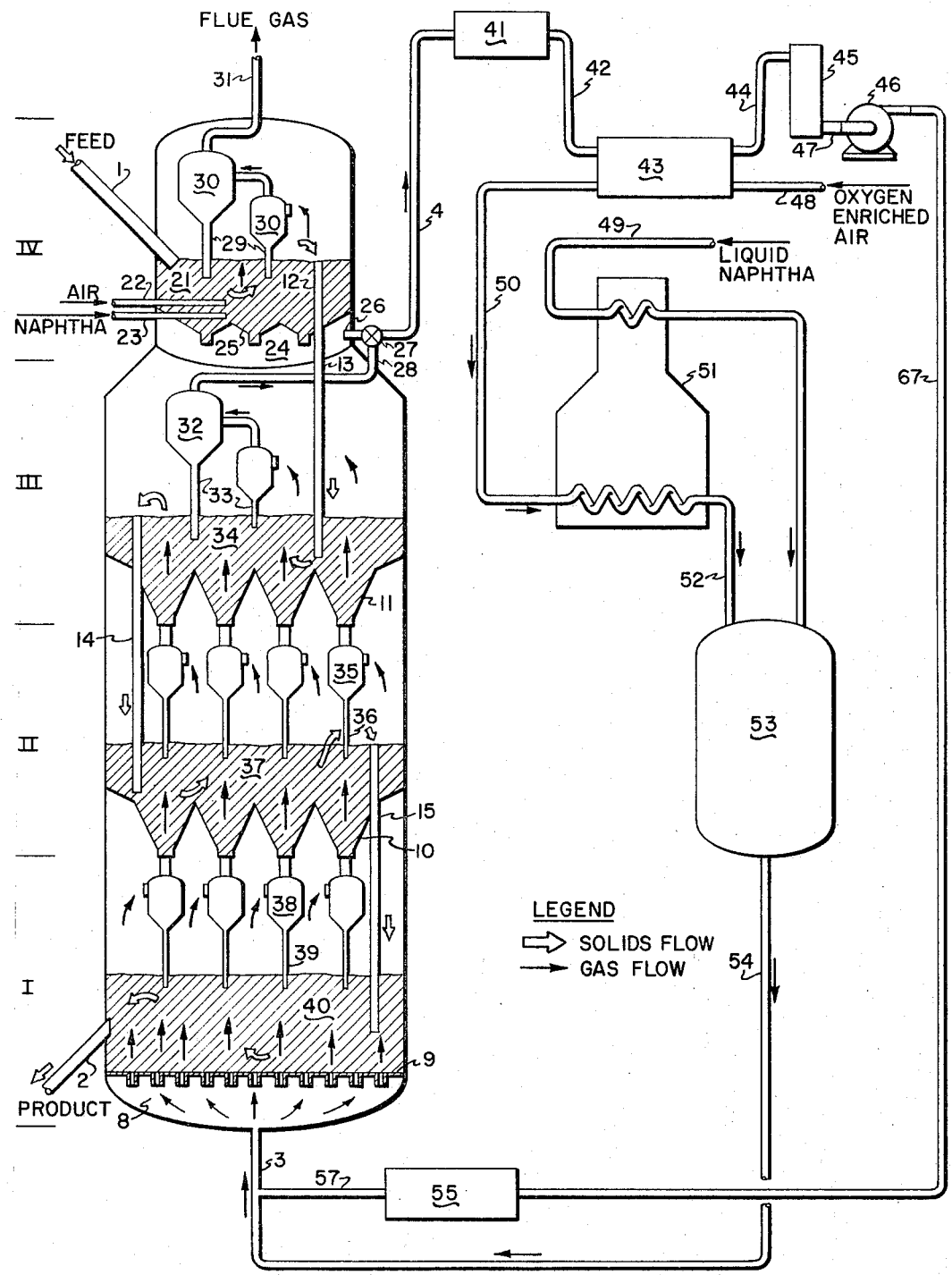

3,303,017
METAL TREATING PROCESS
Francis Xavier Mayer and Robert Glenn Tripp, Baton Rouge, La., assignors to Esso Research and Engineering Company, a corporation of Delaware
Filed Nov. 14, 1963, Ser. No. 323,776
7 Claims. (Cl. 75—26)

This invention relates to a process and apparatus for the reduction of metal oxides with carbon monoxide containing gases. More particularly, this invention relates to a process and apparatus for reducing iron ore to metallic iron in fluid beds wherein the fluidizing gases are introduced into the fluid beds through multiple conical gas distributors. The invention relates to a process of reducing metal oxides at high temperatures with reducing gases containing carbon monoxide and hydrogen wherein the carbon monoxide and hydrogen are partially oxidized to carbon dioxide and water, cooling the hot, partially oxidized gases, removing carbon dioxide and water, recompressing the treated gases, reheating the gases, and feeding them back to the reducing zone. The apparatus for carrying out the reduction consists of a preheat-prereducing zone, a ferric reducing zone, and a ferrous reducting zone.

In order to develop an efficient, practical direct reduction process for metal oxides, it is necessary to find an inexpensive reducing gas and an economic, efficient method for supplying the heat necessary to carry out the reduction reaction. A process where the reducing gas is used on a once-through basis may be satisfactory where the efficiency of reduction is high and where the cost of reducing gas is low. However, in order to lower the cost of the reducing gas it is desirable in some cases to recycle the reducing gas. In using a once-through system where a gas generator is used to produce the carbon monoxide-hydrogen reducing gas, the gas comes from a generator at about 2500° F. A part of the effluent gas is removed from the stream and quenched in, for example, a waste heat boiler to substantially cool it, and it is then recombined with the major portion of the effluent gas to produce a gas of the proper temperature for introduction to the ferrous reducing zone. The waste heat boiler technique for reducing the temperature of the effluent gas from the synthesis gas generator to a temperature that could be used in the ferrous reduction zone has proved to be unsatisfactory due to carburization and carbon deposition in the waste heat boiler.

In fluid beds operating at high gas velocity of from 2-5 ft./sec. at the outlets of the beds, fines are entrained through the cyclone and will plug holes in conventional grid type gas distributors. The pressure exerted by the weight of the iron causes a significant change in the superficial velocity of the fluidizing gas as it travels through the bed. At gas rates sufficient to initiate fluidization in the upper portions of the bed, the lower portion of the bed is not sufficiently fluidized to give good gas solids contact. At higher velocities sufficient to fluidize the lower portion of the bed, the upper portion is overfluidized and results in high fines entrainment.

A suitable inexpensive reducing gas is one prepared by partially oxidizing carbonaceous fuel with air to produce a reducing gas containing carbon monoxide, hydrogen, and nitrogen. A major problem encountered in direct reduction of iron ore is in providing sufficient heat in the reducing zone to carry out the reduction. Several schemes have been considered for supplying the heat to an iron ore reduction zone. One method of providing the heat involves preheating the iron ore to an extremely high temperature prior to introducing it into the reducing zone, thereby allowing the sensible heat of the preheated ore to supply the heat of the endothermic reaction. Another method is to preheat the reducing gas to excessively high temperatures and allow the sensible heat of the reducing gas to provide the heat required to carry out the reduction. Either of the schemes alone has proven to be unsatisfactory. However, use of both of these schemes together, but not heating to the extreme high temperatures, has provided a very practical means of providing heat to the reactor.

In providing preheat to the ore, several schemes have been tried. For example, cyclone gas heaters have been used wherein the off-gas from the reduction reaction is burned with air in a cyclone and the solids heated and the air reduced in temperature removed from the cyclone. Another technique is to gradually heat the incoming ore feed to a high temperature in a transfer line by injecting either off-gas into the line or an extraneous fuel and burning it with air while conveying the solids upward into the ferric reducing zone. Another way of heating the solids in a preheat zone is to combust in a plenum chamber underneath the preheat zone off-gas from the reducing zone and/or add extraneous fuel with air and then to introduce the hot combustion products directly into the preheat zone to heat the incoming ore. Providing heat for the endothermic reaction carried out in the ferrous reduction zone where high $H_2$ content gas has been used has been a major problem. It is desirable, of course, to conserve all the heat in the synthesis gas produced by the synthesis gas reaction. For example, catalytic synthesis gas generators and non-catalytic synthesis gas generators produce a synthesis gas at a temperature of 1600 to 2500° F. This, of course, is too high to be introduced directly into the ferrous reducing zone. One means for reducing the temperature of this gas to a temperature which can be used in the reducing zone of about 1400–1600° F. is to cool a portion of this gas to about 500° F. and then remix the cool gas with the remainder of the gas which is at about 2500° F. and adjust the proportion so that the gas introduced into the ferrous reducing zone is at a temperature of 1400–1600° F. However, due to the carbon monoxide content of the synthesis gas, the techniques used to cool the portion of the gas to 500° F. have been unsatisfactory due to catastrophic carburization as the carbon monoxide containing gas passes through the temperature range of 900–1200° F.

In using grid-type gas distributors for fluid bed operations, cyclone gas-solid separators have been used between beds whereby the relatively solids-free gas from the bottom bed is introduced into a plenum chamber and through a grid into the above fluid bed. However, due to the solids content of the gas, even though slight, these grids at the high temperatures of operation have tended to plug. The cyclones used have generally been constructed and placed outside of the reducing zone and the fines material removed from the gases from the fluid bed reduction zone have been returned through diplegs either to the same bed or to a bed of a higher degree of reduction. Having the cyclones placed external to the reducing zones, however, produces several problems due to heat loss and to the number of openings that must be made in the walls of the apparatus. The more cyclones there are, the more openings and subsequent reduction of the strength and integrity of the apparatus. This is a serious problem with apparatus operated at elevated temperatures and pressures. Several attempts have been made to overcome the grid plugging problem in large ferric beds, which attempts have been unsuccessful to date. In small diameter units, single conical gas distributors have been of some value in fluidizing the beds even where the gases contain finely entrained solids. Attempts to use the conical gas distributors or to scale them up for larger diameter apparatus have been disappointing. Using multiple conical gas distributors where the gas is introduced through a plenum chamber and the gas feed into the multiple conical gas distributors from the plenum chamber, fluidization of the bed has been uneven and inefficient due to plugging of one or more of the conical gas distributors and resultant uneven gas distribution in the fluid bed.

The term "catastrophic carburization" is defined as the reaction that occurs when carbon is deposited from a gas containing carbon monoxide on a metal surface under conditions such that some of the carbon deposited reacts with the metal surface to form a metal carbide, which in turn catalyzes the reaction causing the deposition of more carbon at a more rapid rate. The deposition of carbon will cause plugging and failure of equipment due to pressure buildup and/or the carburization of the metal surface will cause pitting, weakening and failure of the metal surface and equipment. The carburization reaction is a major problem with carbon monoxide containing gases at temperatures between 900 and 1200° F.

In accordance with the present invention, metal oxides can be reduced by contacting said oxides with a reducing gas containing carbon monoxide and hydrogen wherein efficient use of reducing gases is obtained by recycling the off-gas from one of the reducing zones. The solids in the fluid beds are fluidized by gas passed through multiple conical gas distributors. Each conical gas distributor is fed by a separate cyclone in such a manner that the solids in each of the conical gas distributors are maintained in a fluid state and do not bog or plug, thereby providing even distribution of gas throughout the bed. The conical gas distributors provide a reactor system with countercurrent gas-solids flow and with a very low pressure drop. Low pressure drop is desirable since it reduces solids attrition, cuts gas compression costs, and reduces superficial velocity differences between the staged beds. The tapered sides of the conical gas distributors maintain the superficial gas velocity as the gas rises through the fluid bed and results in smooth fluidization. In a fluid bed utilizing a fluidizing grid, as a result of the velocity gradient due to the gas passing through the fluid bed, particle size segregation of the bed occurs. The larger particles tend to settle to the bottom of the bed and the smaller, lighter particles migrate toward the top. The higher concentration of fines in the upper portion of the bed would normally result in undesirably high entrainment rates. Particle size segregation renders relatively inefficient gas-solids contacting. By properly tapering the containing vessel, the increase in gas velocity as the gas rises in the bed can be controlled to minimize particle size segregation. Particle size segregation and the increase in fines concentration near the top of the bed utilizing a standard fluidizing grid further increases the plugging problem since a larger proportion of fines is entrained in the gas and cause plugging problems in the grid in the reducing zone above.

In the present invention, grid plugging due to fines carryover is overcome by the use of conical gas distributors, that is, multiple conical gas distributors, each conical gas distributor being fed by a separate cyclone. Solids attrition in the ferric reduction zone is reduced by the use of the conical distributors because the high gas velocities that would normally occur by passage of gas through the holes of a grid type distributor are eliminated by use of conical gas distributors. One of the scale-up problems of obtaining even gas distribution through a fluid bed of large diameter has been overcome by applicants' invention since gas flow through each of the conical gas distributors is assured by feeding each one through a separate cyclone.

The apparatus utilized in the present invention consists of a preheat zone (the first zone to which the ore to be treated is fed), a ferric reducing zone (where the ore is reduced from $Fe_2O_3$ to $Fe_3O_4$ and $FeO$), and two ferrous reducing zones in series (in which the ore is reduced from $Fe_3O_4$ and $FeO$ to $Fe$). Heat is provided in the preheat zone by injecting air directly into the preheat zone which burns off-gas. The combustion products of the off-gas and air supply the fluidizing gas in this zone. Additional heat may be provided by adding an extraneous fuel such as naphtha, and burning in the ferric zone as well as the preheat zone. The combustion can be controlled so that the ore can be prereduced in the preheat zone as well as preheated. Normally, in the recycle system utilized in accordance with the present invention, some of the off-gas from the ferric reduction zone will be purged to control the nitrogen concentration in the recycle gases. This purge gas can advantageously be used as a low value fuel to provide some of the preheat in this preheat-prereduction zone.

The second ferrous bed has as a fluidizing means a novel grid. Because the gas entering this zone is clean, that is, free of entrained solids, a grid can be used with less chance of plugging. However, even though the grid has less of a plugging problem, there still is a tendency to plug where the openings in the grid are simple orifice openings. This plugging is due to solids back-flow into the grid during periods of uneven gas flow through the orifice openings. Plugging of the grids due to solids back-flow has been overcome by utilizing jet nozzles in place of simple orifice openings in the grids.

The problem of the high temperature of the effluent gases from catalytic and non-catalytic gas generators is overcome by quenching this hot effluent gas with cool recycle gas so that both gases, after mixing, are at about the desired temperature for introduction into the ferrous reducing zone. The cyclones feeding each of the multiple conical gas distributors of the present invention are all enclosed in the apparatus and within each bed only one or two of the diplegs from the cyclones are used to remove fines from the bed. This technique allows control of the amount of fines in a particular bed and improves fluidization and gas-solids contacting in the bed. It was found that the fines concentration in the bed could be controlled within the desired range by removing the fines from just one or two of the cyclones. The fines are removed and sufficient amount of the fines is returned to the same bed to control the fines concentration in the bed between 5 and about 20 wt. percent of the solids in that bed. Another technique for controlling the fines concentration of the fluid bed is to have all the diplegs from the cyclones fed to an aerated trough on the side of the bed and the solids withdrawal from the bed made at this point so as to control the fines concentration in the bed. This technique has some disadvantages and the former technique is preferred.

The reducing gas containing carbon monoxide and hydrogen may be made by any of the several conventional methods involving partial combustion of a carbonaceous fuel in the presence of an oxygen-containing gas. The reducing gas can be contacted in a staged countercurrent system with the metal oxides to be reduced which are present in finely divided form in fluid beds, whereby the metal oxides are reduced and a portion of the reducing gases are oxidized to carbon dioxide and water. The reduction reaction is carried out at elevated temperatures and the effluent gases are withdrawn at high temperatures. In order to regenerate the reducing gas so that it is suitable for recycle, it is necessary to remove the oxidation products of the reduction reaction from the reducing gas, namely the carbon dioxide and the water. The effluent gases are withdrawn from the reducing zone and rapidly cooled to a temperature below the dew point of the water present. Condensed water is removed. For efficient removal of carbon monoxide it is desirable to lower the temperature of the effluent gases still further to about ambient temperature and remove any additional water present.

The gases leaving the ferric reduction zone, gas outlet, are at somewhat lower pressure than that which exists in the second ferrous reducing zone, gas inlet. This difference in pressure is due to the pressure loss of the reducing gases as they pass through the fluid bed reduction zones. In order to reintroduce this gas into the bed of the lowest degree of oxidation, i.e., highest degree of reduction, it is necessary to increase the pressure of the recycle gas to the pressure existing in that zone. The recycle gas is compressed at ambient temperature and then reheated to the temperature above the temperature existing in the reactor to which it is to be introduced.

The reduction of metal oxides with a reducing gas comprising carbon monoxide and hydrogen is known in the art. Various ores, including iron, nickel, chromium, vanadium, and titanium ores, can be reduced in this manner. This invention is principally concerned with, though not limited to, the reduction of iron oxides to metallic iron. Reducing gases containing carbon monoxide can be made from carbonaceous fuel, heavy residua, liquid and gaseous petroleum hydrocarbons, and the like. These fuels can be partially oxidized with an oxygen-containing gas whereby the oxygen supplied is insufficient to completely oxidize the carbonaceous fuel to $CO_2$ and $H_2O$ to produce carbon monoxide and hydrogen. The ratio of carbon monoxide to hydrogen produced will depend largely on the particular fuel used. The principal processes known for producing gases containing carbon monoxide and hydrogen involve the use of a catalytic gas reformer, a non-catalytic gas reformer, fluid coke bed, and the like. The particular fuel from which the reducing gas is formed and the method of forming the fuel do not form an essential part of the present invention.

When using air, or oxygen-enriched air, as the oxygen-containing gas to reform the carbonaceous fuel, the reducing gas will contain a certain amount of nitrogen. Having nitrogen present in the reducing gas is advantageous to a certain extent in that it provides a denser fluidizing gas which gives smoother fluidization in the reduction zone. However, excessive amounts of nitrogen are not desirable in the reducing gas in that it tends to dilute and diminish the effect of the reducing constituents present. Therefore, in a recycle system the reducing gas is continuously purged to remove excessive amounts of $N_2$ from the reducing gas. Where part of the gas is used as fuel for preheat of feed as described herein, a separate purge is usually not necessary.

In a preferred embodiment of the present invention, liquid naphtha and oxygen enriched air are injected into a non-catalytic gas generator which is at a temperature of 2200–2600° F. The naphtha is oxidized to carbon monoxide and hydrogen. This method is preferred because a very high quality gas is obtained at a high temperature at low cost. The effluent gases comprise carbon monoxide, hydrogen and nitrogen. There is little carbon dioxide and water produced under these conditions. The reaction conditions are maintained so that the amount of carbon dioxide and water produced is less than 4%. The hot effluent gases can be used directly, after cooling with recycle gas, in the reduction zone which contains essentially metallized iron, without an unfavorable rate effect on the reduction reaction. These gases supply to the reduction zone the sensible heat of the gases, which heat is sufficient to effect the reduction of the iron oxide to metallic iron in said reduction zone.

Sufficient heat can be supplied by merely burning the fuel to carbon monoxide to carry out the endothermic reduction reaction in the reducing zone and to rapidly preheat the recycle gases. The recycled carbon monoxide plus hydrogen, at about 800° F., on being mixed with the hot synthesis gas at about 2400° F. is almost immediately brought up to the temperature desired in the fluid bed reducing zone. The recycle gas can be preheated to about 800° F. in a conventional furnace without carbon deposition or catastrophic carburization.

In the above described manner, efficient means of making a high quality, low cost reducing gas containing carbon monoxide and hydrogen and a simple, efficient means of recycling this gas and avoiding the problems of carbon deposition, plugging of equipment, and catastrophic carburization of metal vessels has been realized.

In a preferred embodiment of the invention, the direct reduction of iron ore is carried out in a fluidized bed of finely divided particles of ore which are directly contacted with reducing gas. The fluidized beds can be 5 to 30 ft. in diameter and 3 to 40 ft. in height. The finely divided ore, when fluidized by the reducing gases, takes on the appearance of a liquid and has an apparent density, depending on the velocity and particle size distribution, between 50 lbs./cu. ft. and 180 lbs./cu. ft. Also, much like a liquid, the pressure at the bottom of this bed will be roughly directly proportional to the height of the bed.

The fines concentration in the fluid beds is critical to efficient fluid bed operation. The addition of fines will substantially increase the gas solids contacting efficiency and the gas utilization. To obtain an efficient operation, the superficial velocity of the gas is generally such that some of the fines are entrained in the gas and removed from the bed. The fines withdrawn from the bed are separated from the gas in a cyclone separator and all or part of the fines are returned to the bed to maintain the desired fines concentration in the bed. Fines can also be removed directly from the bed, e.g., from near the top of the bed, where, due to elutriation, there is a higher concentration of fines. The fines concentration in the bed can be ascertained by pressure or density measurements of the fluid bed at different points in the bed. At specified conditions of gas velocity and temperature, the apparent density of the solids in the fluid bed is directly related to the concentration of fines present in the bed. A suitable bed density for carrying out the reduction reaction would be 70 to 140 lbs./ft.$^3$.

Fines material is defined as particles having a particle size less than $\frac{1}{10}$ to $\frac{1}{3}$ the size of the wt. average size of a given solids material.

The particle size range of the fluidized particles will be between about 10 microns and about 5000 microns. Fines materials are defined as particles having a particle size less than $\frac{1}{10}$ to $\frac{1}{3}$ the size of the wt. average size particle in the fluid bed. For example, particles less than 50 microns would be considered fines in a bed containing particles of 10 to 3000 microns where the wt. average size particle was 500 microns. To obtain efficient gas solids contacting and good bed operations, the fines concentration is maintained at between 5 to 20 wt. percent of the solids in the bed.

Depending on the diameter of the fluid bed in which the iron ore is being reduced, the number of conical gas distributors can vary from about 5 to 20. The diameter of the conical gas distributors can be about 1 ft. to 5 ft. The slope of the sides of the conical gas distributors can be between 30 and 70° from the vertical. Each of the conical gas distributors in a particular fluidized bed will have its own cyclone gas-solids separator to supply its fluidizing gas. In this manner, each of the cyclones will feed an individual conical gas distributor and provide through the particular conical gas distributor an even flow of gas from the bed below to the bed above.

In the second ferrous bed where there are no solids in the fluidizing gas, a novel grid utilizing jet nozzles can be used. The length/diameter ratio of the jet nozzles through which the fluidizing gas is introduced into the bed is critical to prevent solids backflow and is closely related to the velocity of the fluidizing gas. Lower fluidizing gas velocities through the nozzles can be used and solids backflow prevented when the fluidizing grid consists of a plurality of evenly spaced jet nozzles which have a critical ratio of length of the cylindrical bore of the jet nozzle to the inside diameter of the bore of more than about 5 and preferably more than 10. This type of grid prevents backflow of finely divided solids through the jet nozzles into the plenum chamber beneath the grid. Though some solids may pass down into the jet nozzles a short distance if there is a pressure fluctuation in the bed, as soon as the pressure in the bed stabilizes, the solids will be quickly pushed up out of the nozzle and plugging of the nozzle and passage of the solids completely through the nozzle prevented.

The inside diameter of the jet nozzle can be 0.02 to 2 inches. The corresponding lengths of the straight run portions of the jet nozzle can be 5 to 40 times the diameter. Gas velocities through the nozzle at equivalent atmospheric temperature and pressure for air for the length and diameter of the jet nozzle described will be a minimum of 10 to 300 ft./sec.

The ratio of the area of the jet nozzles to the total area of the grid plate will depend on the particular operation carried out, volume of gas and superficial gas velocity through the bed it is desired to maintain.

The figure of the attached drawing illustrates diagrammatically the application of the process of this invention to the reduction of iron ore. Various pumps, valves, heat exchange equipment, monitoring and control equipment have been omitted from the drawing in order to simplify it.

In accordance with the preferred embodiment of the present invention, finely divided iron ore consisting essentially of $Fe_2O_3$ is reduced in stages. This comprises (1) the preheat-prereduction stage, (2) a ferric reduction stage, (3) a first ferrous reduction stage, and (4) a second ferrous reduction stage.

In the drawing, iron ore is introduced into the top bed and passes downward in the plant as shown by open arrows. Reducing gas is generated by partial oxidation of liquid naphtha with oxygen-enriched air in the synthesis gas generator and is introduced into the bottom bed and passage of the gas upward countercurrently to the descending iron ore is shown by closed arrows. The plant consists of an iron ore preheat zone IV, a ferric reducing zone III, and two ferrous reducing zones II and I.

The iron ore feed is ground or milled to a size of 4 mesh to minus 400 mesh and introduced through line 1 into the fluid bed 21 in zone IV in which it is preheated to a temperature of 1000–1800° F. Heat is produced in this bed primarily by partial combustion of liquid naphtha and air is introduced into the bed by lines 23 and 22, respectively. Part of the heat for the preheat zone can be obtained by partial oxidation of off-gas from ferric reducing zone III which can be fed to zone IV through line 26 via valve 27. The removal of the off-gas in this manner acts as a nitrogen purge for the system. The off-gas from zone III can be introduced into plenum chamber 24 of zone IV and the gas flows through conical gas distributors 25 and fluidizes the iron ore solids in zone IV. The major portion of the off-gas withdrawn through lines 28 and 4 via valve 27 is regenerated and recycled. About 70–80 volume percent of the off-gas from zone III will be recycled and regenerated. This off-gas is rapidly cooled to remove water in cooling zone 41, scrubbed to remove carbon dioxide in scrubber 45, reheated and mixed with the freshly generated gas and introduced into ferrous reducing zone I.

In preheat-prereducing zone IV the iron ore introduced into bed 21 is fluidized by the combustion products of air and naphtha and partially by the off-gas introduced into plenum chamber 24 and into the bed through conical gas distributors 25. In the preheat reduction zone the temperature of the iron ore is raised to about 1000–1800° F. There is sufficient amount of carbon monoxide and hydrogen in the combustion gases in this zone to at least partially reduce the $Fe_2O_3$ in part to $Fe_3O_4$, and to provide sufficient preheat at sensible heat of the ore in this bed to carry out the reduction in ferric reduction zone III. Zone IV can be at a pressure of about atmospheric to about 100 p.s.i.g., e.g., about 10 p.s.i.g., and pressure is not particularly critical. The effluent gases from the preheat zone are substantially spent insofar as reducing capacity and fuel value are concerned and are vented to the atmosphere through an appropriate pressure release valve not shown through line 31. Any entrained iron oxide particles that are present in the gas are separated in the cyclone separators 30 and returned through lines 29 to bed 21.

As the iron ore is fed to zone IV, the fluidized bed 21 increases in height and overflows into downcomer 12, whereby it is introduced into bed 34 of ferric reducing zone III. The reducing conditions are such that the $Fe_2O_3$ and $Fe_3O_4$ are reduced substantially to $Fe_3O_4$ and FeO in this bed. The temperature in bed 34 is maintained at about 1300–1400° F. and the pressure at about 5–15 p.s.i.g. higher than the pressure in zone IV, that is, a pressure of about 15 p.s.i.g. The ratio of carbon monoxide to carbon dioxide in this zone is substantially larger than that existing in zone IV and is about 1/1 to 4/1 and the ratio of hydrogen to water in this zone is about 3/1 to 6/1. The reducing gases after reducing the finely divided ore oxide in zone III flow into the chamber above bed 34 and into cyclone separators 32. These off-gases contain entrained solid particles which are separated from the gas in the cyclone and returned to bed 34 via diplegs 33. The fines may all be returned to bed 34 or a portion of them may be returned by means not shown, that is, a suitable dipleg, to bed 37.

The effluent gases from cyclone 32 are passed through line 28 and a portion of it is sent via valve 27 and line 26 into the preheat zone IV to carry out reduction and preheat in that zone. This gas contains a considerable amount of CO and $H_2$, which gas has good reducing capacity and fuel value. As previously described, the major portion of this off-gas, that is about two-thirds to three-fourths by volume of the gas, is taken through valve 27 and line 4 at a temperature of up to about 1400–1600° F. and introduced into water cooling zone 41 where it is directly contacted with a large volume of cold water fed into zone 41 and rapidly reduced in temperature from about 1400–1600° F. to a temperature below about 900° F. The cooled effluent gases are removed through line 42 and are below the temperature at which either carbon deposition or catastrophic carburization occurs. The water in cooling the hot gases is increased in temperature and can be used to heat other streams or to operate small auxiliary equipment. The water is withdrawn from the cooling zone by appropriate means not shown.

The fluidizing gas fed to zone III is fed through a multiple of conical gas distributors 11, each of the conical gas distributors fed by an individual cyclone 35, thus assuring even gas flow through the conical gas distributors and through fluid bed 34 thereby maintaining an efficient fluid bed operation.

In zone III the $Fe_2O_3$ and $Fe_3O_4$ are reduced essentially to $Fe_3O_4$ and some FeO. As the solids overflow from bed 21 of zone IV through downcomer 12, they build up the level of the solids in zone III and the solids overflow through downcomer 14 into first ferrous reduction zone II. In zone II the $Fe_3O_4$ and FeO are reduced substantially to FeO and some Fe. The temperature in the zone is maintained at about 1300–1400° F. and the pressure at about 5–15 p.s.i.g. higher than the pressure in zone III, that is, about 20 p.s.i.g. The off-gases from this zone contain some entrained fines which are introduced into cyclones 35 and substantially all the fines are removed and returned to the bed through diplegs 36. The substantially solids-free gases are then introduced through conical gas distributors 11 into zone III wherein they fluidize the solids in bed 34. As the solids introduced into zone II build up, they overflow into downcomer 15 and flow into the second ferrous reduction zone I. The FeO and Fe are introduced into bed 40 of zone I wherein they are reduced to substantially Fe. By using two ferrous reduction zones into each of which is introduced high capacity reducing gas containing high ratios of CO to $CO_2$ and $H_2$ to $H_2O$, substantially complete reduction of the iron ore to Fe is accomplished.

The hot reduced ore product is withdrawn from zone I through line 2 and is collected.

Depending on the conditions of reduction in zones I and II, the iron product can be 85–98% metallized, that is, 85 to 98% of the iron present will be in metallic form. The composition of the reducing gas introduced into bed 40 is important. The gas is introduced into bed 40 through line 3. In bed 40, the reducing gas is partially oxidized while reducing the FeO to Fe. The effluent gases in bed 40 are collected in a chamber above bed 40 and, together with any entrained solids, are introduced into cyclone separators 38. The effluent gases contain a carbon monoxide to carbon dioxide ratio of about 10/1 to 4/1 and an $H_2$ to $H_2O$ ratio of about 10/1 to 4/1. The temperature of the off-gases is about 1400–1500° F. and the pressure in this zone is about 5–15 p.s.i.g. higher than in zone II, that is, the pressure is about 25 p.s.i.g. The concentration of $H_2O$ and $CO_2$ in the reducing gas introduced into bed 40 is important because if more than about 4% $CO_2$ and $H_2O$ are present, the rate of the reduction of FeO to Fe will be prohibitively slow. However, sufficient heat must be added, as the sensible heat of reducing gas fed to bed 40, to carry out the endothermic (where high $H_2$ content gas is used) reductions in bed 40 and to assist in carrying out the endothermic reductions in bed 37. All or part of the entrained fines drawn into cyclone separators 38 are returned to ferrous reduction zone I via dipledgs 39. Where part of the fines are not returned to bed 40, they can be removed by having one or more of the diplegs 39 passing to the outside of zone I.

The fluidizing gas velocity in each of the fluid beds is maintained at about 3–5 ft./sec. In zone 1, the second ferrous reducing zone, any unreduced FeO from zone II, the first ferrous reducing zone, is reduced to Fe. The fluidizing means in zone I is grid 9 which contains novel jet nozzles which prevent the backflow of solids into plenum chamber 8. The nozzles have a length to inside diameter ratio of about 5:1 to 20:1. The fines concentration, that is, particles of less than 200–325 mesh, is maintained in each of the beds in their respective zones I–IV between about 5 and 20 wt. percent of the solids in the respective beds.

Reducing gas consisting of CO, $H_2$ and $N_2$ at a ratio of 1/1.7/1.3 and containing less than about 4% $H_2O$ and $CO_2$ is produced by the non-catalytic oxidation of liquid naphtha with oxygen-enriched air. The naphtha is preheated to about 700–800° F. and air is preheated to about 1800° F. Partial oxidation of the naphtha is carried out in the gas generator 53 operated at a temperature of about 2400–2600° F. The air is preheated in heat exchanger 43 by heat exchange with the hot off-gas in line 42 from a temperature of about 200 to 700° F. The preheated air in line 50 is further heated in preheat furnace 51 to about 1800° F. Liquid naphtha is preheated from about 60° F. to about 700–900° F. in preheat furnace 51 and then introduced in non-catalytic gas generator 53 through line 49 where it is partially oxidized with oxygen-enriched air introduced through line 52. The combustion products from gas generator 53 are at a temperature of about 2400–2600° F. and are withdrawn through line 54. The gas at this temperature is too hot for introduction directly into ferrous reducing zone I and must first be cooled to about 1400–1600° F. The cooling of this gas is advantageously obtained by mixing it with cool, recycle gas from line 57 prior to introduction into ferrous reducing zone I. The proportions of the gas are controlled so that the temperature of the mixture is maintained at the desired temperature. The amount of cooling of the hot effluent gases can be controlled by the amount of recycle gas used and the amount of heating of the recycle gas in heat exchanger or furnace 55 which can be easily controlled. The recycle gas is heated to a temperature of about 800° F. in furnace 55. The combined recycled gas and generated synthesis gas is introduced into ferrous zone I at a pressure of 5–15 p.s.i.g. higher in that zone, that is, of about 30 p.s.i.g. Naphtha is preheated to about the temperature just below that at which cracking would occur. In the gas generation zone 53, the naphtha is oxidized to CO and $H_2$ and the conditions are maintained so that little or no $CO_2$ or $H_2O$ is formed and little or no hydrocarbons remain in the effluent gases. By controlling the amount of naphtha introduced into gas generator 53 and the amount of air introduced into the generator and the amount of oxygen, the temperature in the generator can be closely controlled and the concentration of $CO_2$ and $H_2O$ in the effluent gases can be kept at a minimum.

Referring to cooling zone 41, the cooled gases are withdrawn through line 42 and introduced into heat exchanger 43. In zone 41, the gases are rapidly cooled from about 1400° F. to below about 800° F. In heat exchanger 43, the gases are further cooled to about 200° F. while heating the oxygen-enriched air to about 800° F. In cooling the effluent gases below the dew point of the moisture in the gases, water condenses and is removed by means not shown. The primary purpose of zone 41, however, is to rapidly cool the hot gases to a temperature below about 900° F., e.g., the gases are cooled from a temperature of about 1400–1600° F. in less than about 0.1 to 1 second to a temperature below 900° F. This gas is then scrubbed, for example with ethanolamine, to remove carbon dioxide in scrubber 45. The gases thus treated are withdrawn through line 47 and introduced into compressor 46 wherein the pressure is increased sufficiently to reintroduce the gases into ferrous reducing zone I.

The regenerated gases substantially reduced in $CO_2$ and $H_2O$ are withdrawn through line 67 and recycled to the process. The recycle gases are at about ambient temperatures, though elevated pressure, and serve as an efficient quench for the hot gases produced in reducing gas generator 53. The particular method or means effecting the removal of carbon dioxide is not a part of the present invention and therefore needs no detailed description.

Prior to heating and introduction of the regenerated recycle reducing gas to the gasification zone, it is necessary to increase the pressure of these gases in order that they may be introduced into the gasification zone This is because there is a considerable difference in pressure between the pressure in zone IV and zone I due to the passage of the gases through the various fluidized beds and the various pieces of equipment. This recycle gas is increased in pressure by compressor 46 while still at ambient temperature to a pressure of about 5 to 20 p.s.i.g. higher than the pressure in reducing zone I, that is, to about 40 p.s.i.g. The thus pressurized gas is fed to furnace 55, as heretofore described, and gradually heated by indirect heat exchange to a temperature just below the temperature at which carbon deposition and catastrophic carburization occur. This temperature will be about 800–900° F. The thus gradually heated recycle gas is then introduced into line 3 where it is admixed with hot synthesis gas at about 2500° F. and temperature rapidly brought up through the temperature range of 900–1200° F. to about 1400–1600° F. Because of the rapid heat transfer on mixing of these gases and the relatively large amount of sensible heat of the hot synthesis gas in line 54, this temperature increase is substantially instantaneous, for example, a time of only about 0.1 to 1 second is required. Due to the rapid increase in temperature of the recycle gas, little or no catastrophic carburization or carbon deposition occurs in lines 57, 54, or 3.

The reduced iron product is suitable for use to replace scrap iron or scrap steel in steel manufacture. It will be understood that the proportions of carbon monoxide and hydrogen may be varied and that the gases may be obtained from any suitable source. Therefore, the embodiment of the invention described herein should be considered as illustrative and not as limiting the scope of the invention. The present invention is illustrated by the following example.

*Example*

Iron ore containing $Fe_2O_3$ is ground to a suitable size for fluidization and is introduced into a ferric reduction zone where it passes from the ferric reduction zone countercurrently to reducing gas into ferrous reduction zone thereby being reduced in stages from $Fe_2O_3$ to Fe to about 85-95% metallization. The Fe-containing product is withdrawn and stored for later use. The finely divided iron ore is reduced in four stages to metallic iron. The first stage of reduction is also a preheat stage. The last two stages of reduction are ferrous reduction zones. The ore is reduced by countercurrently contacting it with a reducing gas consisting essentially of CO and $H_2$ and nitrogen. Reducing gas is produced by gasifying a naphtha fuel with oxygen-enriched air in a non-catalytic gas generator at about 2400-2600° F. and at elevated pressure. The carbon-to-hydrogen ratio of the fuel is about $C_1H_{2.3}$. The ratio of air to fuel is about 2.6:1. These conditions produce a high quality reducing gas containing less than 4% $CO_2$ and $H_2O$. The reducing gas is fed to a 500 metric ton/day reactor producing 85% metallized product. About 10-20 vol. percent of the effluent gases from the ferric reduction zone, wherein the iron ore is reduced from $Fe_2O_3$ to $Fe_3O_4$, is fed to the preheat-prereducing zone to be burned with air to partially reduce and to preheat the incoming ore. Additional heat is added to this zone by the direct injection of air and liquid naphtha into the fluid bed in this zone.

About 80-90 vol. percent of the off-gas from ferric reduction zone is rapidly cooled by direct contact with cooling water and then treated to remove $H_2O$ and $CO_2$. This gas is then recompressed to a pressure sufficient to introduce it into the line coming from the gas generator. After compression, the gas is heated by indirect heat exchange to about 800° F. and then is blended with the hot effluent gas from the gas generator which is at a temperature of 2500° F. and the blended gases controlled to obtain a temperature of about 1400-1600° F. The blended gases are introduced into the ferrous reduction zone to maintain the temperature in that zone at about 1400° F. By blending a small volume of the recycle gas which is at about 800° F. with the hot effluent gases from the synthesis gas generator, which are at about 2500° F., the temperature of the recycle gas is rapidly increased to about 1600° F. in about less than 1 second thereby preventing carbon deposition and catastrophic carburization while the recycle gas transits the temperature range of 900-1200° F. This gas also quenches the hot synthesis gas so that the synthesis gas can be used in the reduction of iron oxide to metallic iron. Efficient gas solids contacting and even fluidization is maintained in the first ferrous reduction zone by utilizing a novel fluid grid. In accordance with the novel feature of the present invention, fluidization in the second ferrous reduction zone and in the ferric zone and in the preheat zone is maintained by utilizing multiple conical gas distributors, each of which is fed by a separate cyclone. The fluidizing gas velocity is maintained at about 3 to 5 ft./second.

The hot reduced iron product can be fed directly to a heating zone without the iron product coming into contact with the atmosphere to melt the iron to molten iron. The melted iron would separate into a light slag layer containing any impurities and a heavy liquid layer containing pure iron. The slag layer can be withdrawn leaving pure iron. Alternately, the hot reduced iron product can be briquetted. The briquettes can be formed at elevated pressure and temperature and can be easily handled and are not pyrophoric. The briquettes can later be melted and purified or used as synthetic scrap and fed directly to steel making processes.

Obviously, many modifications and variations of the invention as heretofore set forth may be made without departing from the spirit and scope thereof. The metallic iron product can also be purified by converting the metallic iron to iron carbonyl and separating the iron carbonyl as either liquid or gas from the contaminants and later decomposing the liquid or gaseous carbonyl to form pure metallic iron and gaseous carbon monoxide. The important feature of the present invention is to use multiple conical gas distributors in large diameter iron ore reduction reactors wherein each of the conical gas distributors are individually fed by a separate cyclone gas solids separator thereby maintaining even flow of gases through each of the conical distributors and uniform flow of gas through the fluid bed.

The invention is not to be limited by the above description which is merely illustrative of applicants' invention. The invention is to be limited only by the appended claims.

What is claimed is:

1. In the process of reducing iron ore by direct reduction in a fluid bed, the improvement which consists of introducing the fluidizing gas into the fluid bed through multiple conical gas distributors, each of which is fed by a separate cyclone gas-solids separator.

2. An apparatus for carrying out the direct reduction of iron ore in a fluid bed which comprises at least two conical gas distributors, each fed by a separate cyclone gas-solids separator.

3. The apparatus of claim 2 wherein the cyclones are located internally and directly feed gas to the conical gas distributors.

4. The apparatus of claim 2 wherein the conical gas distributors are one to five feet in diameter, and the sides of which slope 30 to 60° from vertical.

5. The apparatus of claim 2 wherein the diameter of the bed is five to thirty feet.

6. In a reactor having enclosed walls spaced apart to define a chamber, gas inlet and gas outlet means to the chamber, and within the confines of which chamber particulate iron ore solids can be provided and contacted with upwardly flowing gases to form a fluidized bed and to directly reduce the ore, the improvement comprising a plurality of conical gas distributors disposed across the flow space inside the walls of the reactor to distribute gases and support the bed, each of said conical gas distributors providing downwardly sloping enclosing side walls defining cone-shaped openings diverging upwardly from holes at the bottom, and to each of the holes are communicated, from below, separate cyclone gas-solids separators for feeding gases upwardly through the holes.

7. The apparatus of claim 6 wherein from about 5 to about 20 conical gas distributors are disposed across the flow space inside the walls of the reactor.

References Cited by the Examiner

UNITED STATES PATENTS

| | | | |
|---|---|---|---|
| 2,404,944 | 7/1946 | Brassert | 75—26 |
| 2,503,788 | 4/1950 | White. | |
| 2,734,850 | 2/1956 | Brown. | |
| 2,965,449 | 12/1960 | Jukkola | 75—26 X |

BENJAMIN HENKIN, *Primary Examiner.*